United States Patent
Yoo et al.

(10) Patent No.: US 9,991,509 B2
(45) Date of Patent: Jun. 5, 2018

(54) ANODE ACTIVE MATERIAL INCLUDING POROUS SILICON OXIDE-CARBON MATERIAL COMPOSITE AND METHOD OF PREPARING THE SAME

(71) Applicant: LG Chem, Ltd., Seoul (KR)

(72) Inventors: Jung Woo Yoo, Daejeon (KR); Je Young Kim, Daejeon (KR); Yong Ju Lee, Daejeon (KR); Seung Youn Choi, Daejeon (KR); Yoon Ah Kang, Daejeon (KR); Mi Rim Lee, Daejeon (KR); Hye Ran Jung, Daejeon (KR)

(73) Assignee: LG Chem, Ltd. (KR)

( * ) Notice: Subject to any disclaimer, the term of this patent is extended or adjusted under 35 U.S.C. 154(b) by 125 days.

(21) Appl. No.: 14/168,185

(22) Filed: Jan. 30, 2014

(65) Prior Publication Data

US 2014/0154578 A1 Jun. 5, 2014

Related U.S. Application Data

(63) Continuation of application No. PCT/KR2013/010922, filed on Nov. 28, 2013.

(30) Foreign Application Priority Data

Nov. 30, 2012 (KR) .......................... 10-2012-0138533
Nov. 27, 2013 (KR) .......................... 10-2013-0145166

(51) Int. Cl.
| H01M 4/36 | (2006.01) |
| H01M 4/04 | (2006.01) |
| H01M 4/1393 | (2010.01) |
| H01M 4/02 | (2006.01) |

(52) U.S. Cl.
CPC ......... H01M 4/366 (2013.01); H01M 4/0402 (2013.01); H01M 4/0428 (2013.01); H01M 4/1393 (2013.01); H01M 2004/021 (2013.01)

(58) Field of Classification Search
CPC .... H01M 4/366; H01M 4/386; H01M 4/0402; H01M 4/0428; H01M 4/0426
See application file for complete search history.

(56) References Cited

U.S. PATENT DOCUMENTS

| 7,378,075 | B2 * | 5/2008 | Someya ................. B82Y 30/00 423/447.3 |
| 9,059,462 | B2 * | 6/2015 | Park ...................... H01M 4/485 |
| 2002/0164479 | A1 | 11/2002 | Matsubara et al. |
| 2005/0136330 | A1 | 6/2005 | Mao et al. |
| 2007/0111102 | A1 | 5/2007 | Inoue et al. |
| 2008/0020282 | A1 | 1/2008 | Kim et al. |
| 2009/0029256 | A1 | 1/2009 | Mah et al. |
| 2009/0176151 | A1 | 7/2009 | Kim |
| 2010/0015514 | A1 | 1/2010 | Miyagi et al. |
| 2010/0136431 | A1 | 6/2010 | Lee et al. |
| 2010/0159331 | A1 | 6/2010 | Lee et al. |
| 2010/0261060 | A1 | 10/2010 | Choy et al. |
| 2010/0285359 | A1 | 11/2010 | Hwang et al. |
| 2010/0297502 | A1 | 11/2010 | Zhu et al. |
| 2011/0051322 | A1 * | 3/2011 | Pushparaj ............... C23C 16/24 361/525 |
| 2011/0070488 | A1 | 3/2011 | West et al. |
| 2012/0003540 | A1 | 1/2012 | Nakano et al. |
| 2012/0149551 | A1 | 6/2012 | Gaillard et al. |
| 2012/0258371 | A1 | 10/2012 | Nakanishi et al. |
| 2012/0328947 | A1 | 12/2012 | Chou et al. |
| 2013/0029226 | A1 | 1/2013 | Noh et al. |
| 2013/0089784 | A1 | 4/2013 | Cho et al. |
| 2013/0136994 | A1 | 5/2013 | Ma et al. |
| 2014/0072876 | A1 | 3/2014 | Pushparaj et al. |
| 2014/0113191 | A1 | 4/2014 | Nakamura et al. |

FOREIGN PATENT DOCUMENTS

| CN | 1967910 A | 5/2007 |
| CN | 101106192 A | 1/2008 |
| CN | 101483234 A | 7/2009 |
| CN | 102598366 A | 7/2012 |
| CN | 102738440 A | 10/2012 |
| EP | 2509139 A1 | 10/2012 |

(Continued)

OTHER PUBLICATIONS

Search report from European Patent Application No. 13836222.3 dated Oct. 21, 2014.

(Continued)

*Primary Examiner* — Ula C Ruddock
*Assistant Examiner* — Thomas H. Parsons
(74) *Attorney, Agent, or Firm* — Lerner, David, Littenberg, Krumholz & Mentlik, LLP

(57) ABSTRACT

Provided are an anode active material including a porous silicon oxide-carbon material composite which includes a porous silicon oxide including pores and a line-type carbon material coated on a surface, in the pores, or on the surface and in the pores of the porous silicon oxide, and a method of preparing the anode active material.

Since the silicon oxide of the anode active material according to an embodiment of the present invention may include the plurality of pores, resistance to the mechanical stress due to a volume change may be improved. Also, since the line-type carbon material is bonded to the inside of the pores, conductivity may not be decreased even in the case in which internal cracks occur in the porous silicon oxide and lifetime characteristics may be improved.

14 Claims, 2 Drawing Sheets

(56) References Cited

FOREIGN PATENT DOCUMENTS

| | | | |
|---|---|---|---|
| EP | 2579365 | A1 | 4/2013 |
| JP | H11343109 | A | 12/1999 |
| JP | 2002-293517 | A | 10/2002 |
| JP | 2004220910 | A | 8/2004 |
| JP | 2005263616 | A | 9/2005 |
| JP | 2005-272261 | A | 10/2005 |
| JP | 2008-166013 | A | 7/2008 |
| JP | 2008166013 | * | 7/2008 |
| JP | 2009032693 | A | 2/2009 |
| JP | 2010-251302 | A | 11/2010 |
| JP | 2011-181452 | A | 9/2011 |
| JP | 2012-506363 | A | 3/2012 |
| JP | 2012-123909 | A | 6/2012 |
| JP | 2012169300 | A | 9/2012 |
| JP | 2012527735 | A | 11/2012 |
| JP | 2013084601 | A | 5/2013 |
| KR | 2004-0082876 | A | 9/2004 |
| KR | 2008-0091883 | A | 10/2008 |
| KR | 2008-0111809 | A | 12/2008 |
| KR | 20100014933 | A | 2/2010 |
| KR | 20100062297 | A | 6/2010 |
| KR | 2010-0073506 | A | 7/2010 |
| KR | 2010-0120919 | A | 11/2010 |
| KR | 2012-0066349 | A | 6/2012 |
| KR | 2012-0069704 | A | 6/2012 |
| KR | 2012-0069730 | A | 6/2012 |
| WO | 2010/135446 | A1 | 11/2010 |
| WO | 2011-132961 | A2 | 10/2011 |
| WO | 2012133566 | A1 | 10/2012 |

OTHER PUBLICATIONS

International Search Report from PCT/KR2013/010919, dated Mar. 14, 2014.
International Search Report from PCT/KR2013/010922, dated Mar. 17, 2014.
Search Report from European Application No. 1383434.8 dated Sep. 24, 2014.
Khomenko, V.G. et al., "Lithium-ion batteries based on carbon-silicon-graphite composite anodes," Journal of Power Sources, 2007, vol. 165, No. 2, p. 598-608.
Weber, J. et al, "One-dimensional nanostructures: fabrication, characterisation and applications," International Materials Review, 2008, vol. 53, No. 4, p. 235-255.
Li, H. et al., "Enhancing the performances of Li-on batteries by carbon-coating: present and future," Chemical Communications, Nov. 28, 2011 (E.pub.), vol. 48, No. 9, p. 1201-1217.
Huang. R. et al, "Carbon-coated silicon nanowire array films for high-performance lithium-ion battery anodes," Applied Physics Letters, 2009, vol. 95, Article No. 133119.
Kershaw, et al, "Structural Characterization of Coal-Tar and Petroleum Pitches." Energy & Fuels, vol. 7, No. 3, May 1, 1983, pp. 420-425, XP055204772, ISSN: 0887-0624, DOI 10.1021/ef00039a014.
Office Action from European Application No. 13 836 222.3, dated Jul. 31, 2015.

* cited by examiner (a)

(b)

ANODE ACTIVE MATERIAL INCLUDING POROUS SILICON OXIDE-CARBON MATERIAL COMPOSITE AND METHOD OF PREPARING THE SAME

CROSS-REFERENCE TO RELATED APPLICATIONS

The present application is a continuation of International Application No. PCT/KR2013/010922 filed on Nov. 28, 2013, which claims the benefit of Korean Patent Application No. 10-2013-0145166, filed on Nov. 27, 2013 and Korean Patent Application No. 10-2012-0138533, filed on Nov. 30, 2012, the disclosures of which are incorporated herein by reference.

TECHNICAL FIELD

The present invention relates to an anode active material including a porous silicon oxide-carbon material composite and a method of preparing the same.

BACKGROUND ART

In line with recent miniaturization and lightweight trends in electronic devices, the miniaturization and weight reduction have also been required for batteries acting as a power source. Lithium-based secondary batteries have been commercialized as a battery that may be miniaturized, light weighted, and charged to high capacity, and the lithium-based secondary batteries have been used in portable electronic devices, such as small video cameras, mobile phones, and notebooks, and communication devices.

Lithium secondary batteries, as an energy storage device having high energy and power, may be advantageous in that capacities or operating voltages thereof are higher than those of other types of batteries. However, since the safety of the batteries may be problematic due to the high energy, there may be a risk of explosion or fire. In particular, since high energy and output characteristics are required for hybrid vehicles that have recently been in the spotlight, it may be considered that the safety is more important.

In general, a lithium secondary battery is composed of a cathode, an anode, and an electrolyte, in which charge and discharge may be possible because lithium ions, which are discharged from a cathode active material by first charging, may act to transfer energy while moving between both electrodes, for example, the lithium ions are intercalated into an anode active material, i.e., carbon particles, and deintercalated during discharging.

Meanwhile, since there is a continuous need for high-capacity batteries due to the development of portable electronic devices, research into high-capacity anode materials, such as tin (Sn) and silicon (Si), which have significantly higher capacity per unit mass than that of carbon that is used as a typical anode material, have been actively conducted. In the case that Si or a Si alloy is used as an anode active material, volume expansion may increase and cycle characteristics may degrade. In order to address the above limitations, the Si or the Si alloy may be mixed with graphite to be used as the anode active material. However, since the graphite may be non-uniformly distributed during the mixing, the cycle characteristics and lifetime may degrade.

DISCLOSURE OF THE INVENTION

Technical Problem

The present invention provides an anode active material including a porous silicon oxide-carbon material composite and having improved lifetime characteristics, and a method of preparing the same.

Technical Solution

According to an aspect of the present invention, there is provided an anode active material including a porous silicon oxide-carbon material composite which includes a porous silicon oxide including pores and a line-type carbon material coated on a surface, in the pores, or on the surface and in the pores of the porous silicon oxide.

According to another aspect of the present invention, there is provided a method of preparing an anode active material including bonding a metal catalyst to a surface, an inside of pores, or the surface and the inside of the pores of a porous silicon oxide; and forming a line-type carbon material on the metal catalyst.

Advantageous Effects

According to an embodiment of the present invention, since a line-type carbon material is formed on a surface, in pores, or on the surface and in the pores of porous silicon oxide, the line-type carbon material is more uniformly distributed than a case of simply mixing the porous silicon oxide and the line-type carbon material. Thus, conductivity may be further improved, and since the silicon oxide includes the plurality of pores, resistance to the mechanical stress due to a volume change may be improved. Also, since the line-type carbon material is bonded to the inside of the pores, the conductivity may not be decreased even in the case in which internal cracks occur in the porous silicon oxide and lifetime characteristics may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
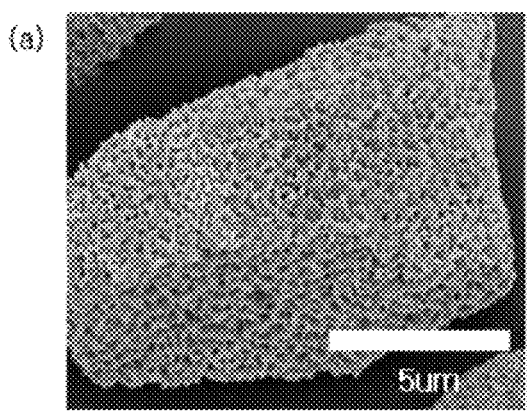
FIG. 1(a) is a scanning electron microscope (SEM) image illustrating a porous silicon oxide.
FIG. 1(b) is an SEM image illustrating a porous silicon oxide-carbon nanotube composite according to an embodiment of the present invention.
Figure 1:
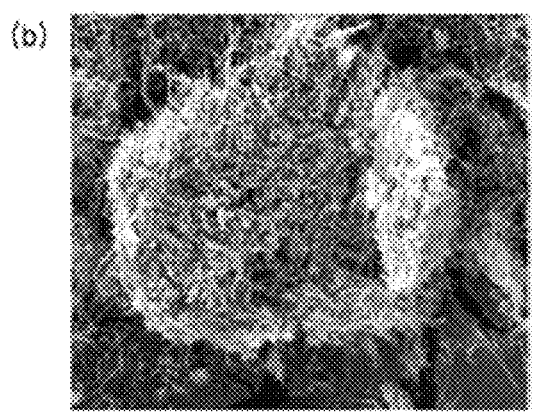

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

An anode active material according to an embodiment of the present invention may include a porous silicon oxide-carbon material composite which includes a porous silicon oxide including pores and a line-type carbon material coated on a surface, in the pores, or on the surface and in the pores of the porous silicon oxide.

FIG. 1(a) is a scanning electron microscope (SEM) image illustrating a porous silicon oxide, and FIG. 1(b) is an SEM image illustrating a porous silicon oxide-carbon nanotube composite according to an embodiment of the present invention. Referring to FIG. 1(b), the silicon oxide-carbon nanotube composite according to the embodiment of the present invention will be described.

In the anode active material according to the embodiment of the present invention, since the line-type carbon material is formed on the surface, in the pores, or on the surface and in the pores of porous silicon oxide, the line-type carbon material is more uniformly distributed than a case of simply mixing the porous silicon oxide and the line-type carbon material. Thus, conductivity may be further improved, and since the silicon oxide includes the plurality of pores, resistance to the mechanical stress due to a volume change may be improved.

In particular, in the anode active material according to the embodiment of the present invention, the line-type carbon material may be formed both on the surface and in the pores of the porous silicon oxide. Also, in this case, since the line-type carbon material may be bonded up to the inside of the pores even in the case in which internal cracks occur in the porous silicon oxide, an amount of a conductive agent used may be decreased to 50% or more and lifetime characteristics may be further improved.

According to an embodiment of the present invention, the line-type carbon material may be included in a direction perpendicular to a tangent line to the surface, the inside of the pores, or the surface and the inside of the pores of the porous silicon oxide.

The porous silicon oxide may include $SiO_x$ (0<x<2), and a Brunauer-Emmett-Teller (BET) specific surface area of the porous silicon oxide may be in a range of 10 $m^2/g$ to 100 $m^2/g$. In the case that the BET specific surface area of the porous silicon oxide is less than 10 $m^2/g$, the volume expansion of $SiO_x$ during charge and discharge may not be prevented. In the case in which the BET specific surface area is greater than 100 $m^2/g$, since mechanical strength may be reduced due to a large amount of pores that are included in $SiO_x$, $SiO_x$ may be fractured during a preparation process of a battery and cracks may occur during the charge and discharge.

The BET specific surface area of the porous silicon oxide may be measured by a BET method. For example, the specific surface area may be measured by a 6-point BET method according to a nitrogen gas adsorption-flow method using a porosimetry analyzer (Belsorp-II mini by Bell Japan Inc.).

In general, silicon particles may accompany crystal changes in reactions which electrochemically absorb, store, and release lithium atoms. Composition and crystal structure of the silicon particles change to silicon (Si) (crystal structure: Fd3m), LiSi (crystal structure: I41/a), $Li_2Si$ (crystal structure: C2/m), $Li_7Si_2$ (Pbam), and $Li_{22}Si_5$ (F23) as the reactions which electrochemically absorb, store, and release lithium atoms proceed. A volume of the silicon particle expands to about 4 times that before the lithium atoms are intercalated, according to the changes in the crystal structure. Since the silicon particles may not withstand the repetitive volume changes during charge and discharge cycles, internal cracks and particle fracture may occur and electrical connections between the adjacent particles may also be reduced. Accordingly, this may be the biggest cause of a decrease in cycle lifetime.

However, since a porous structure in the porous silicon oxide-carbon material composite according to the embodiment of the present invention may absorb the volume expansion and the carbon material formed on the surface and the inside of the particles may maintain continuous electrical connection, the porous silicon oxide-carbon material composite may secure more improved lifetime characteristics.

In the porous silicon oxide-carbon material composite according to the embodiment of the present invention, an average diameter of the pores of the porous silicon oxide may be in a range of 10 nm to 1,000 nm when it is measured on the surface thereof. In the case that the average diameter of the pores is less than 10 nm, the pores may be clogged due to the volume expansion of the porous silicon oxide-carbon material composite during charge and discharge. In the case in which the average diameter of the pores is greater than 1,000 nm, cracks may occur around the pores due to the pores that are larger than the diameter of the composite. The average diameter of the pores on the surface, for example, may be measured from SEM images.

Also, in the porous silicon oxide-carbon material composite according to the embodiment of the present invention, the line-type carbon material may be carbon nanofibers, carbon nanotubes, or a mixture thereof. In the line-type carbon material, the expression "line-type" may be used as a concept including a shape that has a diameter in a nanometer scale and has a high aspect ratio. Also, the expression "line-type" may include a linear shape or a shape that may be curved or bent over the entire or partial length thereof.

In the porous silicon oxide-carbon material composite according to the embodiment of the present invention, an average diameter of the line-type carbon material may be in a range of 1 nm to 200 nm, and an average length thereof may be in a range of 100 nm to 5 μm. Preferably, the average diameter thereof may be in a range of 5 nm to 100 nm, and the average length thereof may be in a range of 500 nm to 2 μm.

Since the line-type carbon material is a highly crystalline carbon-based material and may provide a path through which lithium ions in an electrode may react due to excellent electrical conductivity and lithium ion conductivity, the line-type carbon material may uniformly maintain the distribution of current and voltage in the electrode during charge and discharge cycles. Thus, the line-type carbon material may significantly improve cycle characteristics. In particular, since the carbon nanotube has excellent strength and high resistance to fracture, the deformation of a current collector due to the repetition of charging and discharging or external force may be prevented and the oxidation of the surface of the current collector in unusual environments, such as high temperature and overcharging, of a battery may be prevented. Thus, the carbon nanotube may significantly improve the safety of the battery.

The line-type carbon material may be included in an amount ranging from 1 wt % to 10 wt % based on 100 wt % of the porous silicon oxide-carbon material composite. In the case that the amount of the line-type carbon material is less than 1 wt %, the electrical conductivity of the secondary battery may decrease and thus, the cycle characteristics and lifetime characteristics may degrade. In the case in which the amount of the line-type carbon material is greater than 10 wt %, an initial efficiency may be reduced.

Also, the anode active material according to the embodiment of the present invention may further include a graphite-based material in addition to the porous silicon oxide-carbon material composite. The graphite-based material may include one or more selected from the group consisting of natural graphite, artificial graphite, and mesocarbon microbeads (MCMB).

Furthermore, the present invention may provide a method of preparing an anode active material including bonding a metal catalyst to a surface, an inside of pores, or the surface and the inside of the pores of a porous silicon oxide, and forming a line-type carbon material on the metal catalyst.

Specifically, the method of preparing an anode active material according to an embodiment of the present invention may first include bonding a metal catalyst to a surface, an inside of pores, or the surface and the inside of the pores of a porous silicon oxide.

The bonding of the metal catalyst to the surface, the inside of the pores, or the surface and the inside of the pores of a porous silicon oxide may be performed by a sputtering method, a vacuum deposition method, a chemical vapor deposition (CVD) method, a plating method, or a method of dipping the silicon oxide in a solution of a metal catalyst compound. However, as the simplest and practical method, the bonding may be performed by the method of dipping the silicon oxide in the solution of the metal catalyst compound. The metal catalyst may be supported on the surface and in the pores of the porous silicon oxide by simply dipping the porous silicon oxide in the solution of the metal catalyst compound and then separating, drying, and sintering the porous silicon oxide. However, as a method of more securely supporting the metal catalyst, a method of efficiently fixing the metal catalyst on the surface, in the pores, or on the surface and in the pores of the porous silicon oxide by substituting silicon of the silicon oxide with the metal catalyst may be used.

Also, in order to form a line-type carbon material on the porous silicon oxide using the metal catalyst, it may be necessary for the metal catalyst to be supported as fine particles. However, a method of dipping the porous silicon oxide in a colloidal sol, which is prepared by the hydrolysis of the metal catalyst compound, may be effective.

A compound, such as metal, metal oxide, metal hydroxide, and metal carbide, including one or more selected from the group consisting of chromium (Cr), manganese (Mn), iron (Fe), cobalt (Co), nickel (Ni), copper (Cu), zinc (Zn), molybdenum (Mo), indium (In), tin (Sn), aluminum (Al), and platinum (Pt) may be used as the catalyst that is bonded to the porous silicon oxide. Among the above materials, since oxides and hydroxides of Fe, Ni, and Co are excellent catalysts that may be easily supported, the line-type carbon material may be efficiently formed on the surface, in the pores, or on the surface and in the pores of the silicon oxide.

Also, the method of preparing an anode active material according to the embodiment of the present invention may include forming a line-type carbon material on the surface, in the pores, or on the surface and in the pores of the porous silicon oxide to which the metal catalyst is bonded.

The forming of the line-type carbon material, for example, may be performed by a CVD method. Specifically, the line-type carbon material may be formed on the surface, in the pores, or on the surface and in the pores of the porous silicon oxide by putting the porous silicon oxide having the metal catalyst bonded thereto in a CVD chamber, supplying a mixed gas including hydrocarbon gas, such as ethane, ethylene, and acetylene, and inert gas, such as nitrogen, helium, and argon, and performing a heat treatment.

Also, according to the method of preparing an anode active material according to the embodiment of the present invention, the silicon oxide-carbon material composite is formed, and the anode active material may then be prepared by further mixing a graphite-based material therewith. The graphite-based material may be included in an amount ranging from 1 part by weight to 90 parts by weight based on a total weight of the anode active material.

Furthermore, according to an embodiment of the present invention, the present invention may provide an anode including the anode active material.

In addition, the present invention may provide a secondary battery including a cathode including a cathode active material; a separator; an anode including the anode active material; and an electrolyte.

Since the secondary battery according to an embodiment of the present invention may include an anode active material including the porous silicon oxide-carbon material composite, the lifetime characteristics and initial efficiency of the secondary battery may be improved.

For example, the anode may be prepared by coating an anode current collector with a mixture of an anode active material, a conductive agent, and a binder, and then drying the coated anode current collector. If necessary, a filler may be further added. The cathode may also be prepared by coating a cathode current collector with a cathode active material and drying the coated cathode current collector.

According to an embodiment of the present invention, since the porous silicon oxide-carbon material composite is used as the anode active material, an amount of the conductive agent used may be decreased to about 50% or more in comparison to a typical case and simultaneously, the lifetime characteristics may be improved.

The separator is disposed between the anode and the cathode, and a thin insulating film having high ion permeability and mechanical strength may be used as the separator. Since the current collectors, electrode active materials, conductive agent, binder, filler, separator, electrolyte, and lithium salt are known in the art, the detailed descriptions thereof are omitted in the present specification.

The separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein. Rather, these example embodiments are provided so that this description will be thorough and complete, and will fully convey the scope of the present inventive concept to those skilled in the art.

Example 1: Preparation 1 of Porous Silicon Oxide-Carbon Material Composite

Porous SiO was dipped in an aqueous solution including iron nitrate. Subsequently, an iron catalyst was bonded to a surface and an inside of pores of the porous silicon oxide by drying the mixture thus obtained.

The porous silicon oxide having the metal catalyst bonded thereto was put in a CVD chamber, a mixed gas including hydrocarbon gas, such as ethane, and inert gas, such as nitrogen, helium, and argon, was then supplied, and heated at 800° C. to form carbon nanotubes (CNTs) on the surface and the inside of the pores of the silicon oxide. Thus, a porous silicon oxide-carbon material composite was prepared.

In this case, an amount of the carbon nanotubes was 5 wt % based on 100 wt % of the porous silicon oxide-carbon material composite. Also, an average diameter of the carbon nanotubes was 50 nm and an average length thereof was 2 µm. An average diameter of pores included in the porous silicon oxide-carbon material composite was about 200 nm when measured from the surface of the composite using an SEM.

Example 2: Preparation 2 of Porous Silicon Oxide-Carbon Material Composite

A porous silicon oxide-carbon material composite was prepared in the same manner as in Example 1 except that an amount of carbon nanotubes formed was 1 wt % based on 100 wt % of the porous silicon oxide-carbon material composite. An average diameter of pores included in the porous silicon oxide-carbon material composite was about 200 nm when measured from the surface of the composite using an SEM.

Example 3: Preparation 3 of Porous Silicon Oxide-Carbon Material Composite

A porous silicon oxide-carbon material composite was prepared in the same manner as in Example 1 except that an amount of carbon nanotubes formed was 10 wt % based on 100 wt % of the porous silicon oxide-carbon material composite. An average diameter of pores included in the porous silicon oxide-carbon material composite was about 200 nm when measured from the surface of the composite using an SEM.

Example 4: Preparation 1 of Secondary Battery

The porous silicon oxide-carbon material composite prepared in Example 1 as an anode active material, acetylene black as a conductive agent, and polyvinylidene fluoride as a binder were mixed at a weight ratio of 70:5:25, and the mixture was mixed with a N-methyl-2-pyrrolidone solvent to prepare a slurry. One surface of a copper current collector was coated with the prepared slurry to a thickness of 65 µm, dried and rolled. Then, an anode was prepared by punching into a predetermined size.

$LiPF_6$ was added to a non-aqueous electrolyte solvent prepared by mixing ethylene carbonate and diethyl carbonate at a volume ratio of 30:70 to prepare a 1 M $LiPF_6$ non-aqueous electrolyte solution.

A lithium foil was used as a counter electrode, a polyolefin separator was disposed between both electrodes, and a coin-type secondary battery was then prepared by injecting the electrolyte solution.

Example 5: Preparation 2 of Secondary Battery

A secondary battery was prepared in the same manner as in Example 4 except that the porous silicon oxide-carbon material composite prepared in Example 1 as an anode active material, acetylene black as a conductive agent, and polyvinylidene fluoride as a binder were mixed at a weight ratio of 70:10:20.

Example 6: Preparation 3 of Secondary Battery

A secondary battery was prepared in the same manner as in Example 4 except that the porous silicon oxide-carbon material composite prepared in Example 1 as an anode active material and polyvinylidene fluoride as a binder were mixed at a weight ratio of 80:20.

Example 7: Preparation 4 of Secondary Battery

A secondary battery was prepared in the same manner as in Example 4 except that the porous silicon oxide-carbon material composite prepared in Example 2 as an anode active material and polyvinylidene fluoride as a binder were mixed at a weight ratio of 80:20.

Example 8: Preparation 5 of Secondary Battery

A secondary battery was prepared in the same manner as in Example 4 except that the porous silicon oxide-carbon material composite prepared in Example 3 as an anode active material and polyvinylidene fluoride as a binder were mixed at a weight ratio of 80:20.

Example 9: Preparation 6 of Secondary Battery

A secondary battery was prepared in the same manner as in Example 4 except that the porous silicon oxide-carbon material composite prepared in Example 1 and graphite as an anode active material, acetylene black as a conductive agent, and polyvinylidene fluoride as a binder were mixed at a weight ratio of 95(composite:10, graphite:85):2:3.

Comparative Example 1

A secondary battery was prepared in the same manner as in Example 4 except that porous SiO as an anode active material, carbon nanotubes as a conductive agent, and polyvinylidene fluoride as a binder were mixed at a weight ratio of 70:10:20.

Comparative Example 2

A secondary battery was prepared in the same manner as in Example 4 except that porous SiO as an anode active material and polyvinylidene fluoride as a binder were mixed at a weight ratio of 80:20.

Comparative Example 3

Figure 2:
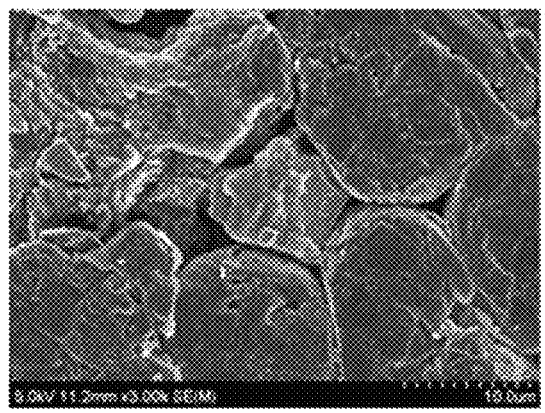
FIG. 2 is an SEM image of an anode active material used in Comparative Example 3, in which poreless silicon oxide and carbon nanotubes are simply mixed.

A secondary battery was prepared in the same manner as in Example 4 except that poreless SiO as an anode active material, carbon nanotubes as a conductive agent, and polyvinylidene fluoride as a binder were mixed at a weight ratio of 70:10:20 (see FIG. 2: scanning electron microscope image of a sample in which $SiO_x$ and carbon nanotubes were simply mixed).

Comparative Example 4

A secondary battery was prepared in the same manner as in Example 4 except that a silicon oxide-carbon material composite, in which carbon nanotubes were grown on poreless SiO, was used as an anode active material.

Experimental Example 1: Scanning Electron Microscope (SEM) Analysis

SEM analyses were respectively performed on a surface of the anode active material prepared in Example 1 and a surface of the anode active material used in Comparative Example 3. The results thereof are respectively presented in FIGS. 1 and 2.

FIG. 1(a) is an SEM image illustrating a porous silicon oxide and FIG. 1(b) is an SEM image illustrating a porous silicon oxide-carbon nanotube composite that is prepared according to Example 1.

Referring to FIG. 1, a porous silicon oxide-carbon nanotube composite (see FIG. 1(b)), in which carbon nanotubes were grown on a surface and in pores of a porous silicon oxide (see FIG. 1(a)), may be identified, and it may be also identified that the porous silicon oxide was coated by forming carbon nanotubes even in the pores.

FIG. 2 is an SEM image of an anode active material that was used in Comparative Example 3, in which poreless silicon oxide and carbon nanotubes are simply mixed. Referring to FIG. 2, in a case where the porous silicon oxide was simply mixed with the carbon nanotubes as in Comparative Example 3, it may be identified that the anode active material was not a composite form, in which carbon nanotubes were grown on the surface of the silicon oxide as in FIG. 1(b), but was a simple mixed form.

Experimental Example 2: Discharge Capacity, Initial Efficiency, and Lifetime Characteristics Analysis The following experiments were performed in order to investigate discharge capacities, initial efficiencies, and lifetime characteristics of the secondary batteries prepared in Examples 4 to 9 and Comparative Examples 1 to 4.

The lithium secondary batteries (battery capacity: 3.4 mAh) prepared in Examples 4 to 9 and Comparative Examples 1 to 4 were charged at a constant current (CC) of 0.1 C to a voltage of 10 mV, and thereafter, charge in the first cycle was performed by charging the lithium secondary batteries at a constant voltage (CV) to a current of 0.17 mAh. After the batteries were left standing for 10 minutes, the batteries were discharged at a constant current of 0.1 C to a voltage of 1.5 V.

First cycle charge capacity and first cycle discharge capacity were measured to obtain a ratio of the first cycle discharge capacity to the first cycle charge capacity for each battery.

Lifetime characteristics of each battery were measured by performing charge and discharge at 0.5 C after a third cycle, and the lifetime characteristics were represented as a ratio of discharge capacity in a 49th cycle to the first cycle discharge capacity.

TABLE 1

| Examples | Carbon nanotubes (wt %) | Discharge capacity (mAh/g, discharge at 1.5 V) | Initial efficiency (%) |
|---|---|---|---|
| Example 4 | 5 | 1568 | 71 |
| Example 7 | 1 | 1568 | 72 |
| Example 8 | 10 | 1530 | 65 |

Initial efficiency: (first cycle discharge capacity/first cycle charge capacity)×100

TABLE 2

| Examples | Content ratio of active material:conductive agent:binder | Lifetime characteristics (%) |
|---|---|---|
| Example 4 | 70:5:25 | 90 |
| Example 5 | 70:10:20 | 95 |
| Example 6 | 80:0:20 | 85 |
| Example 7 | 80:0:20 | 80 |
| Example 8 | 80:0:20 | 90 |
| Example 9 | 95(10 + 85):2:3 | 85 |
| Comparative Example 1 | 70:10:20 | 85 |
| Comparative Example 2 | 80:0:20 | 50 |
| Comparative Example 3 | 70:10:20 | 40 |
| Comparative Example 4 | 70:5:25 | 60 |

Lifetime characteristics: (discharge capacity in a 49th cycle/first cycle discharge capacity)×100

As illustrated in Table 1, it may be confirmed that the discharge capacity and initial efficiency may be changed according to a weight of the carbon nanotubes with respect to a total weight of the porous silicon oxide-carbon material composite. Specifically, in the case that the weight of the carbon nanotubes included was 5 wt % or less (Examples 4 and 7), the discharge capacities and the initial efficiencies were similar. However, in the case in which the weight of the carbon nanotubes was 10 wt % (Example 8), it may be understood that the discharge capacity and the initial efficiency were slightly decreased in comparison to Examples 4 and 7. Therefore, it may be estimated that the performance of the secondary battery may further degrade when the weight of the carbon nanotubes was greater than 10 wt %.

Table 2 illustrates the results of lifetime characteristics according to a content ratio of active material:conductive agent:binder.

As illustrated in Table 2, the lifetime characteristics of the secondary batteries prepared in Examples 4 to 9 were improved in comparison to Comparative Examples 1 to 4.

In particular, with respect to the porous silicon oxide-carbon material composites in Examples 6 to 8, it may be understood that the lifetime characteristics that were equal to or greater than those of Comparative Example 1 using the conductive agent were obtained without using a conductive agent, and the lifetime characteristics were improved twice or more than those of Comparative Examples 2 and 3.

Also, when comparing Example 1 and Comparative Example 4 according to the presence of pores, it may be confirmed that the lifetime characteristics of Example 4 using the porous silicon oxide-carbon material composite were increased to about 30% in comparison to Comparative Example 4 using the non-porous silicon oxide-carbon material composite.

Therefore, it may be understood that since the porous silicon oxide-carbon material composite including the line-type carbon material on the surface, in the pores, or on the surface and in the pores of the porous silicon oxide was used, the conductivity may not be decreased even without using a separate conductive agent and the lifetime characteristics may be improved.

INDUSTRIAL APPLICABILITY

An anode active material according to an embodiment of the present invention may improve conductivity and resistance to the mechanical stress due to a volume change. As a result, lifetime characteristics of a secondary battery may be improved. Thus, the anode active material may be suitable for secondary batteries.

The invention claimed is:

1. An anode slurry comprising:
an anode active material, a binder, a conductive agent and a solvent;
wherein the anode active material comprises a porous silicon oxide-carbon material composite, the porous silicon oxide-carbon material composite comprising:
a porous silicon oxide including pores; and
a line-type carbon material formed on the surface and in the pores of the porous silicon oxide,
wherein an average diameter of the pores of the porous silicon oxide is in a range of 200 nm to 1,000 nm when the average diameter is measured on the surface of the porous silicon oxide,
wherein an average diameter of the line-type carbon material is in a range of 1 nm to 50 nm,
wherein the line-type carbon material is included in a direction perpendicular to a tangent line to the surface and the inside of the pores of the porous silicon oxide, and the average diameter of the pores are greater than the average diameter of the line-type carbon material, and
wherein the line-type carbon material is prepared by a method comprising bonding a metal catalyst to the surface and the inside of the pores of a porous silicon oxide, and forming a line-type carbon material on the metal catalyst, and
the bonding of the metal catalyst to the surface and the inside of the pores of the porous silicon oxide is performed by a method of dipping the silicon oxide in a solution of a metal catalyst compound.

2. The anode slurry of claim 1, wherein the porous silicon oxide comprises $SiO_x$, where $0<x<2$.

3. The anode slurry of claim 1, wherein a Brunauer-Emmett-Teller (BET) specific surface area of the porous silicon oxide is in a range of 10 $m^2/g$ to 100 $m^2/g$.

4. The anode slurry of claim 1, wherein the line-type carbon material is carbon nanofibers, carbon nanotubes, or a mixture thereof.

5. The anode slurry of claim 4, wherein an average length of the line-type carbon material is in a range of 100 nm to 5 μm.

6. The anode slurry of claim 1, wherein the line-type carbon material is included in an amount ranging from 1 wt % to 10 wt % based on 100 wt % of the porous silicon oxide-carbon material composite.

7. The anode slurry of claim 1, wherein the anode active material further comprises a graphite-based material.

8. The anode slurry of claim 7, wherein the graphite-based material comprises one or more selected from the group consisting of natural graphite, artificial graphite, and mesocarbon microbeads (MCMB).

9. A method of preparing the anode slurry of claim 1, the method comprising:
bonding a metal catalyst to the surface and the inside of the pores of a porous silicon oxide;
forming a line-type carbon material on the metal catalyst; and
mixing the product produced by the forming step, a binder, a conductive agent and a solvent,
wherein the bonding of the metal catalyst to the surface and the inside of the pores of the porous silicon oxide is performed by a method of dipping the silicon oxide in a solution of a metal catalyst compound.

10. The method of claim 9, wherein the porous silicon oxide comprises $SiO_x$, where $0<x<2$.

11. The method of claim 9, wherein the metal catalyst comprises one or more selected from the group consisting of chromium (Cr), manganese (Mn), iron (Fe), cobalt (Co), nickel (Ni), copper (Cu), zinc (Zn), molybdenum (Mo), indium (In), tin (Sn), aluminum (Al), and platinum (Pt).

12. The method of claim 9, wherein the forming of the line-type carbon material is performed by a CVD method.

13. An anode prepared by a method comprising coating the anode slurry of claim 1 onto a current collector and drying.

14. A lithium secondary battery comprising the anode of claim 13.

* * * * *